(12) United States Patent
Lew (10) Patent No.: US 7,965,275 B1
(45) Date of Patent: Jun. 21, 2011

(54) USER INTERFACE FOR LENIENT EXCEPTION FEEDBACK

(75) Inventor: Karl Lew, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1191 days.

(21) Appl. No.: 11/332,416

(22) Filed: Jan. 13, 2006

(51) Int. Cl.
*G09G 5/00* (2006.01)
*G06F 9/44* (2006.01)

(52) U.S. Cl. ........ 345/156; 717/100; 717/103; 717/104; 717/105; 717/102

(58) Field of Classification Search .................. 345/156, 345/10, 28, 501, 534, 535, 565, 571; 715/503, 715/505, 507–509, 206, 760, 239, 853, 255; 709/206, 245, 234, 224; 707/102, 103, 1, 707/3, 10, 204; 702/150; 719/315, 328; 705/31; 717/100–105
See application file for complete search history.

(56) References Cited

U.S. PATENT DOCUMENTS

| | | | | |
|---|---|---|---|---|
| 5,414,809 A * | 5/1995 | Hogan et al. ................. | 715/765 |
| 6,487,713 B1 * | 11/2002 | Cohen et al. .................. | 717/105 |
| 6,792,475 B1 * | 9/2004 | Arcuri et al. ................. | 709/245 |
| 7,120,901 B2 * | 10/2006 | Ferri et al. .................... | 717/128 |
| 7,127,672 B1 * | 10/2006 | Patterson et al. ............. | 715/220 |
| 7,191,119 B2 * | 3/2007 | Epstein et al. ................. | 704/10 |
| 7,231,267 B2 * | 6/2007 | Bournas et al. ................ | 700/91 |
| 7,349,385 B2 * | 3/2008 | Wattwood et al. ............ | 370/354 |
| 7,366,990 B2 * | 4/2008 | Pitroda ......................... | 715/745 |
| 7,460,977 B2 * | 12/2008 | Stromberg et al. ........... | 702/150 |
| 7,523,086 B1 * | 4/2009 | Teague et al. ..................... | 707/1 |
| 2002/0046144 A1 * | 4/2002 | Graff .............................. | 705/36 |
| 2002/0091700 A1 * | 7/2002 | Steele et al. .................. | 707/100 |
| 2002/0097277 A1 * | 7/2002 | Pitroda ......................... | 345/854 |
| 2004/0119743 A1 * | 6/2004 | Xu ................................ | 345/760 |
| 2004/0172347 A1 * | 9/2004 | Barthel .......................... | 705/31 |
| 2004/0205473 A1 * | 10/2004 | Fisher et al. ................... | 715/500 |
| 2005/0028081 A1 * | 2/2005 | Arcuri et al. ................ | 715/501.1 |
| 2005/0038644 A1 * | 2/2005 | Napper et al. ..................... | 704/9 |
| 2005/0060372 A1 * | 3/2005 | DeBettencourt et al. ..... | 709/206 |
| 2005/0132304 A1 * | 6/2005 | Guido et al. .................. | 715/853 |
| 2005/0216503 A1 * | 9/2005 | Charlot et al. ............ | 707/103 R |
| 2006/0282458 A1 * | 12/2006 | Tsyganskiy et al. .......... | 707/102 |
| 2007/0011321 A1 * | 1/2007 | Huntington et al. .......... | 709/224 |
| 2007/0016849 A1 * | 1/2007 | Aureglia et al. .............. | 715/503 |
| 2009/0138389 A1 * | 5/2009 | Barthel ........................... | 705/31 |

* cited by examiner

*Primary Examiner* — Prabodh M Dharia
(74) *Attorney, Agent, or Firm* — Osha • Liang LLP (57) ABSTRACT

A method for contextually representing errors during data entry, including obtaining an expandable and collapsible tree (ECT) having a first node and a second node corresponding to multiple tasks for data entry; displaying a portion of the ECT including the second node, where the first node stems from the second node; presenting a record, corresponding to a task represented by the first node, including a data field for entry of data; receiving a data entry error for input to the data field of the record, where the data entry error is inconsistent with a predetermined range of acceptable data; and displaying, on the ECT and in association with the second node, an error indicium indicative of the data entry error while allowing further progression through the multiple tasks.

17 Claims, 8 Drawing Sheets

WizardForm

Payroll Setup Tasks

1. Sign-Up for Payroll Service
2. Setup Company Options
   - 2.1: Compensation
   - 2.2: Insurance
   - 2.3: Retirement
   - 2.4: Paid Time Off
   - 2.5: Miscellaneous
3. Employees
   - 3.1: Employee List
4. Taxes
5. Payroll History
6. Checking your Payroll Data

Step 3.1: Employee List

Use the Add, Edit and Delete buttons to create your employee list.

Employee

| Employee | Social Security | Edit | Summary |
|---|---|---|---|
| Susan B. Anthony | 111-11-1111 | Edit | |
| Lynn Hill | 222-22-2222 | Edit | |
| Steph Davis | 333-33-3333 | Edit | |
| Brittany Griffith | 444-44-4444 | Edit | |
| Tiffany Campbell | 555-55-5555 | Edit | |
| Elizabeth Burwell | 334 | Edit | Enter employee state of residence. Ente... |

Add Employee
Delete Employee

Finish later     < Back     Next >

USER INTERFACE FOR LENIENT EXCEPTION FEEDBACK

BACKGROUND

The present invention relates to data entry on a computer system. Financial services software has automated many repetitive, but important tasks. For example, bill payment software is designed to ease the process of paying bills electronically. Generally, the bill payment software provides a user interface for entering account and payment information, and setting up periodic payment instructions. As a result, and in some cases without further user input, the payment software automatically submits the payment instructions to a payment processing system.

The configuration process for setting up the financial services software is typically a burdensome process, especially for inexperienced users. It is important that numerous data fields be populated with accurate information. Because the information is critical to performing the financial services, the configuration process will conventionally stall the process upon detecting a data entry error. For example, if a user enters an account number that does not match a given format for account numbers, the configuration process will not continue receiving data. Thus, the user has to either retrieve correct information before continuing or discontinue configuration.

Also, because conventional configuration processes either accept or reject data, there is no way of flagging data as suspicious by the application or as unreliable by the user, even though the data is technically acceptable. For example, a user can enter an account number from memory that, although is in the correct format, is not considered reliable by the user.

SUMMARY

In various embodiments, the present invention provides methods and systems for tolerating and navigating data entry errors. In one embodiment, a computerized (or automated) financial service is configured. The steps for configuration are displayed at various levels of abstraction (e.g., displayed as an expandable tree). The data entries can be information that is critical to operation of the financial services, such as account numbers, dates, and social security numbers. An error is detected when a data entry is received that is inconsistent with a predetermined range of acceptable data. In other embodiments, an error can be detected when data is not within a range of expected data, a user marks data as unreliable, or data is missing. In response to detecting the error, an error indicium marks the error while allowing the configuration to continue.

The error indicium is displayed in association with a related configuration step. At a later point in time, a user can navigate back to the error using the error indicium as markers. The configuration step can be an abstraction of nested tasks which can be expanded to show the nested tasks. As progressively lower level tasks are revealed, an error indicium marks tasks that have underlying errors. Within the record itself, a data field can be marked with an error indicium. Then the user can remediate the error.

BRIEF DESCRIPTION OF THE DRAWINGS

One skilled in the art will recognize that these Figures are merely examples of the operation of the invention according to one or more embodiments and that other configurations and modes of operation can be used without departing from the essential characteristics of the invention as set forth in the claims.

DETAILED DESCRIPTION OF THE EMBODIMENTS

In various embodiments, the present invention provides methods and systems for tolerating and navigating data entry errors in a user interface. In one embodiment of data entry, the errors are entered in the user interface while configuring software, such as financial software. The data entries can be information that is critical to operation of the financial software program such as account numbers, dates, and social security numbers. The errors can be data entry errors such as data that is not within a predetermined range of acceptable data, data that is not within a range of expected data, data that a user determines is unreliable, and/or data that is missing. A user can navigate back to and correct errors generated during configuration.

Figure 1:
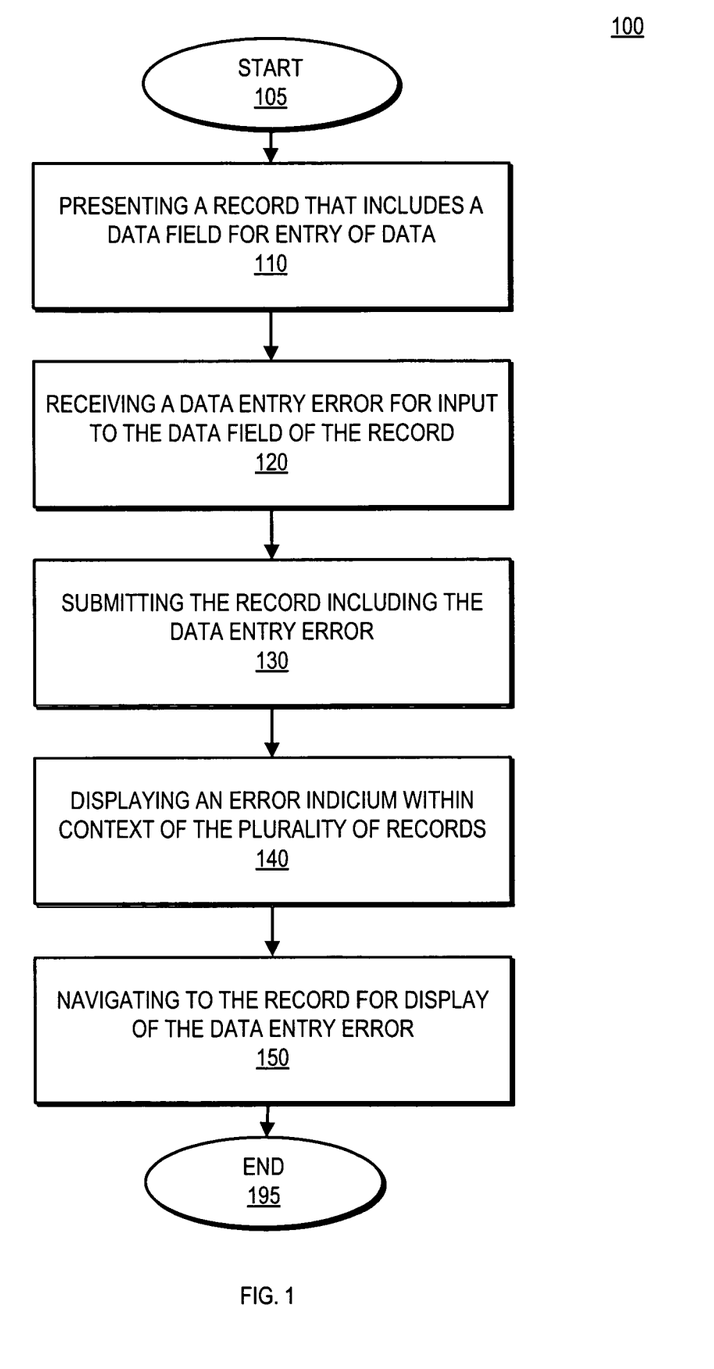
FIG. 1 is a flow chart illustrating a method for presenting errors within context according to one embodiment of the present invention.

FIG. 1 is a flow chart illustrating a method 100 for presenting errors within context according to one embodiment of the present invention. The method allows a user to navigate back to erroneous data entries without cessation of the configuration process. In one example, the method 100 is implemented in a financial software application, as described more fully below, during the configuration process. In other examples, the method 100 is implemented in a software application that relies upon data entered into records.

A record is presented which includes one or more data fields for entry of data 110. The record can be, for example, an employee record, a transaction record, or a profile. One embodiment of a record 700 is illustrated in the schematic diagram of FIG. 7. The record 700 can be used to add a new employee to a database of employees. The record 700 includes several data fields to collect information under a certain category. More particularly, each employee has data fields relating to employee information, employee home address, and contact information. Data can be entered to the data fields using, for example, a keyboard to enter ASCII text. In another embodiment, such as in a tax accounting software application, the record 700 can be used to enter monetary amounts (e.g., amount of a paycheck or account balance).

A data entry error is received for input to the data field of the record 120. In one embodiment, errors can be hard, soft, or manual. A hard error can occur when a data entry to a critical data field is not acceptable, as described below with respect to FIG. 2A. A soft error can occur when a data entry is not expected (e.g., type of data is not expected, or value of data is not expected), as described below with respect to FIG. 2B. A manual error can occur when a data entry is determined by a user to be unreliable, as described below with respect to FIG. 2C.

A record is submitted which includes the data entry error 130. Rather than prevent the user from continuing through the configuration process, in one embodiment, even a hard error will be tolerated so long as the user is apprised of the hard error. As described below, a user is allowed to navigate back to, and remediate, erroneous data at a later time. In one embodiment, a double submission can be required to continue the process. For example, after the first submission attempt, attention is drawn to the data entry error with, for example, an error indicium (e.g., an icon or highlighting of text). In another example, a submission can be delayed for an increment of time (e.g. 0.5 or 1.0 seconds) in which the error indicium is displayed. Within a data structure associated with the application, a flag can be set (e.g., a TRUE or FALSE bit), an error code can be stored (e.g., description of error), or some other digital indication of the error. Thereby, a user is alerted of errors without discontinuing the configuration process.

In response to submission or the data entry record, an error indicium can optionally be displayed within context of the plurality of records 140. The context of an error can be established by, for example, an outline of the configuration process. In one embodiment, the outline comprises an expandable tree that displays details within one part of an outline upon selection. The expandable tree allows different views of the configuration process.

One example of the expandable tree includes three levels: a task list, types of records within a task, lists of records within a record type, and actual records. The task list can form an interview process necessary to configure automated financial activities such as automatic deposits to or from a payroll. A task can include several types of records for payroll such as compensation payments, insurance payments, and retirement payments. A record type can include, for example, an employee list. In turn, the employee list can include a list of employee records. Each employee record comprises a number of data entry fields. The indicium is displayed proximate to, and in context with, a level that includes the error. If the current view is of tasks, the indicium will be displayed next to the appropriate task. On the other hand, if the current view is of the list of records, the indicium is displayed next to the appropriate record. Of course additional layouts are possible.

A user can navigate to the record for display of the data entry error 150. Perhaps at a later time, after the user has been able to retrieve correct data, the user is able to find errors within the configuration process and correct them. Using the indicium, the user traverses the tree in order to identify the record of interest. When the record itself is displayed, the data field containing the error can be identified with indicium.

Figure 2A:
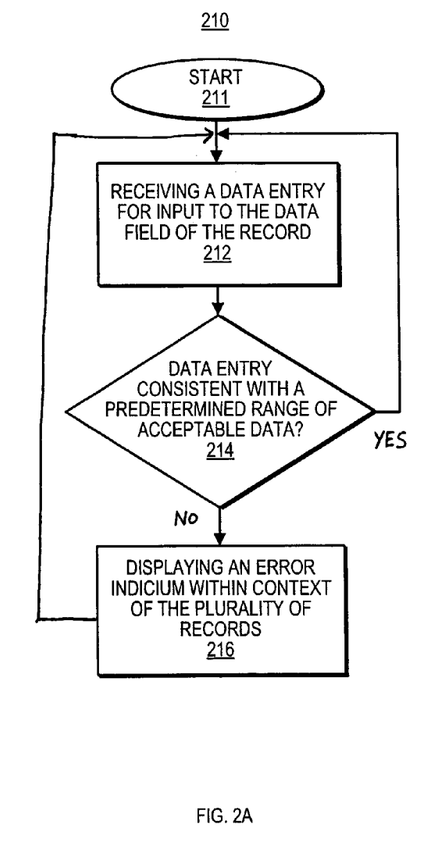
FIGS. 2A-C are flow charts illustrating methods for determining error types according to one embodiment of the present invention.
Figure 2B:
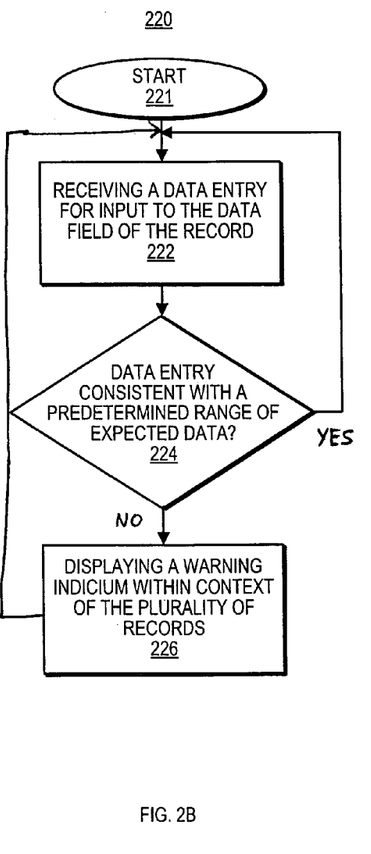
Figure 2C:
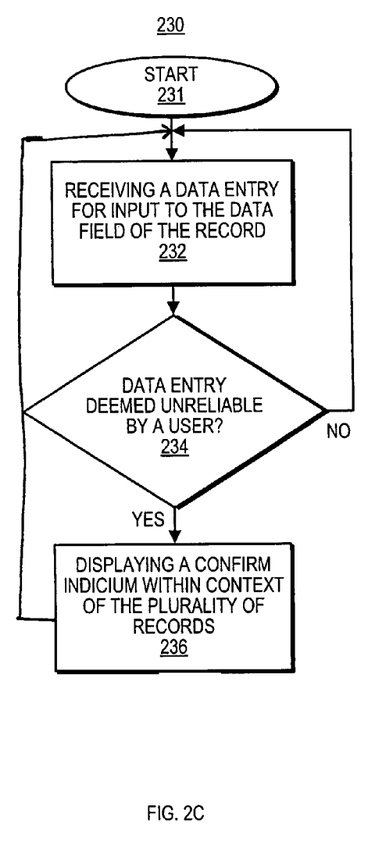

FIGS. 2A-C are flow charts illustrating methods 210, 220, 230 for determining error types according to one embodiment of the present invention. An error can be detected, responsive to submitting a record during configuration, or alternatively, immediately when entered in the data field.

In FIG. 2A, a record submission is tested for hard errors. A data entry is received for input into the data field of the record 212. The data entry is compared with a predetermined range of acceptable data 214. The predetermined data can be a database populated with, for example, exact data values or particular data types that are acceptable. For example, a data field for entry of a social security number may have several restrictive parameters. First, a social security number should only contain numerical values, so non-numerical data entries signify errors. Additionally, the social security number should contain nine numbers, and there may be further characteristics such as numerical values that are not valid for the first digit of the social security number. Other data field entries can have additional characteristics such as only text values. In another example, there is a closed set of values that can be selected for data fields such as when selecting a state in the United States. In response to detecting a hard error, an error indicium is displayed within context of the plurality of records 216.

In FIG. 2B, a record submission is tested for soft errors. A data entry is received for input into the data field 222. The data entry is compared to a range of expected data 224. The expected data can be set by limits that are normally or reasonably acceptable, but not definite. Whereas it is impossible to have a negative value for number of children, a hard error, it is highly unlikely to have 13 children, although not impossible. In response to detecting the soft error, a a warning indicium is displayed within context of the plurality of records 226.

In FIG. 2C, a record submission can be marked with a manual error by a user. A data entry is received for input into the data field 232. The data entry, although it may be within acceptable and/or expected ranges so as not to trigger an error or warning indicium, can be deemed unreliable by a user 234. In other words, the user generates the error. In response, a confirm indicium is displayed within context of the plurality of records 236.

In some embodiments, data entries can be tested for each of hard, soft, and manual errors. In other embodiments, variations are possible such as testing for one or two types or errors, or testing for other types of errors outside of the examples listed herein.

Figure 3:
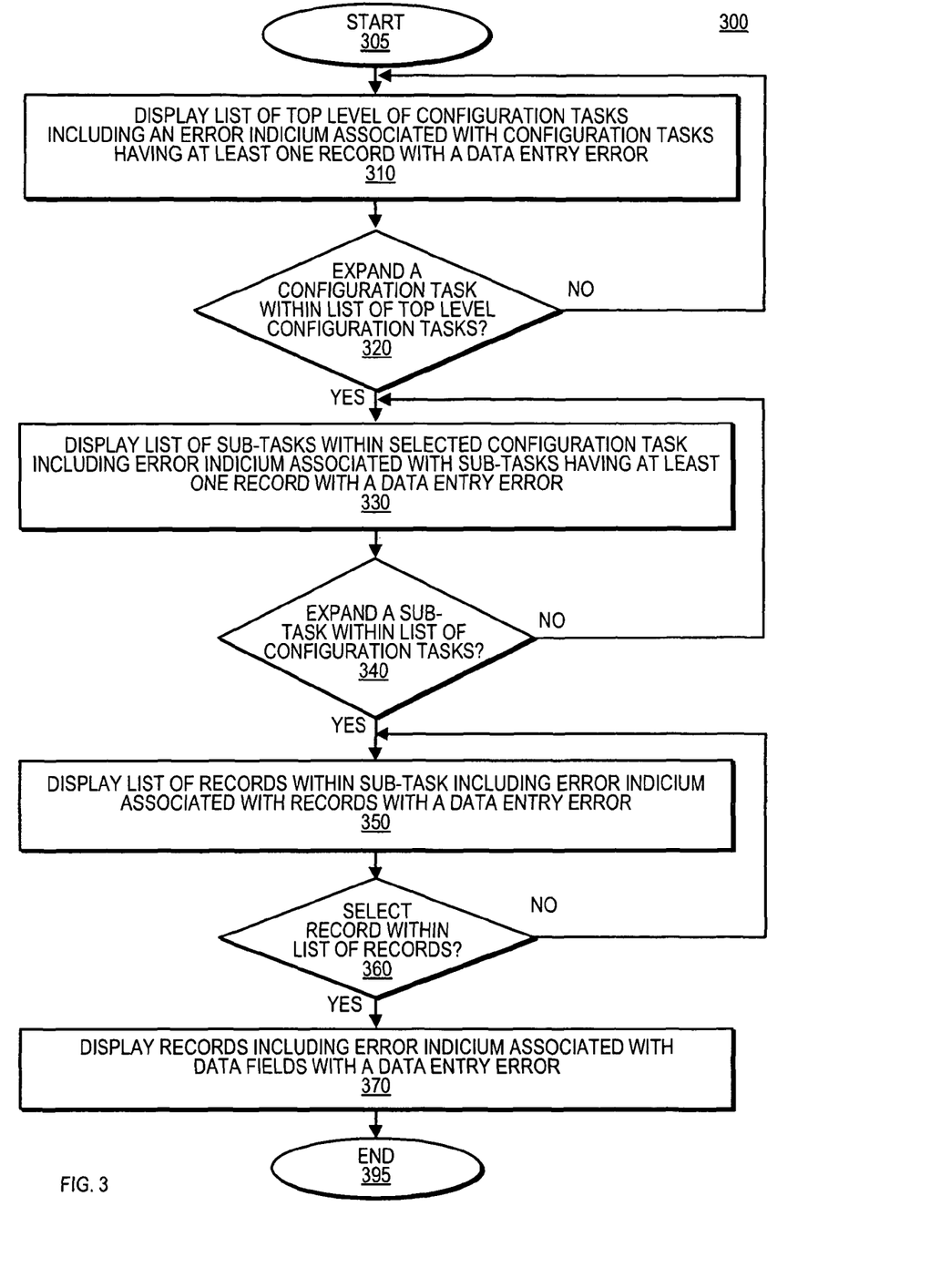
FIG. 3 is a flow chart illustrating a method for navigating errors according to one embodiment of the present invention.

FIG. 3 is a block diagram illustrating a method 300 for navigating errors in context according to one embodiment of the present invention. Configuration tasks organized in an outline format can be presented in an expandable tree format. That is, when a member of the tree is selected, additional tasks within the task can be presented, and so on. The expandable tree provides navigation to errors nested within a task. Depending on a current view of the expandable tree, the error can be presented in various contexts with respect to the actual error. In one embodiment, errors are presented in this manner after a user has already attempted to complete the configuration process, but has entered data errors in doing so.

Figure 4:
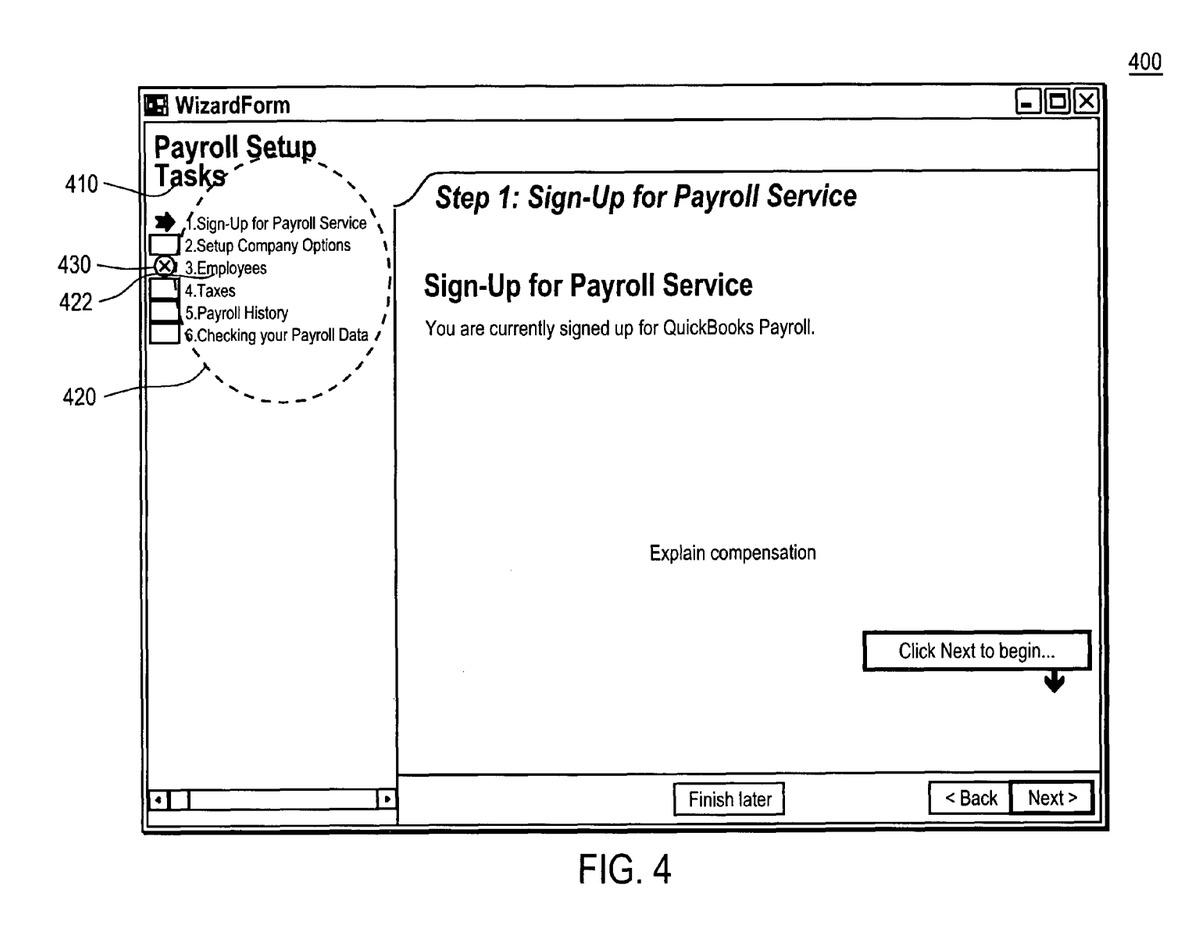
FIG. 4 is a schematic diagram illustrating a top-level of configuration tasks according to one embodiment of the present invention.

In one view, a list of top-level configuration tasks is displayed 310. The top-level tasks include error indicium to show which top-level tasks having at least one data entry error. One example of top-level payroll set-up tasks 410 is illustrated in FIG. 4. A user interface 400 includes a list of top-level tasks 420 that are to be completed to set up automated payroll deposits for an employer. Specifically, the list of tasks 420 include steps for: Signing-Up for a Payroll Service, Setting-Up Company Options, Adding Employee Information, Setting-Up Tax Deductions, Tracking a Payroll History, and Checking Payroll Data. An error indicium 430 indicates that the task for Adding Employee Information contains an error. The error can be contained in one of the many sub-tasks and individual records nested within the task. By selecting the task for adding employee information, a user can navigate to the error.

Figure 5:
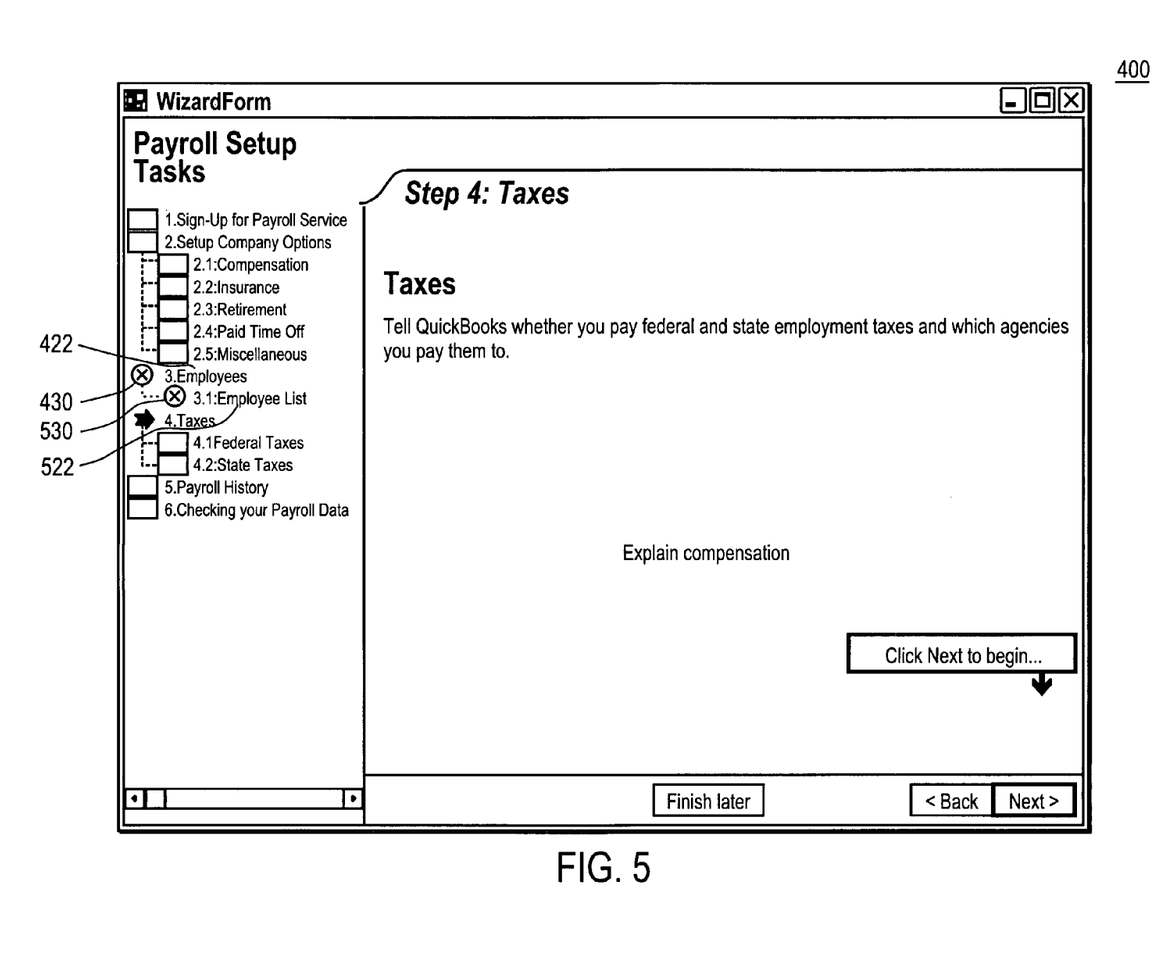
FIG. 5 is a schematic diagram illustrating a list of sub-tasks within a selected configuration task according to one embodiment of the present invention.

Referring again to FIG. 3, in response to selecting a member of the list of top-level tasks, the member is expanded into a list of additional tasks nested therein 320. A list of sub-tasks within the selected configuration tasks is displayed 330. As with the top-level tasks, an error indicium shows which sub-tasks have at least one data entry error. FIG. 5 illustrates one example of the user interface 400 that includes the sub-task Creating Employee List 522 as an expansion to the top-level task Adding Employee Information 422. An error indicium 530 indicates errors within the sub-task, thereby allowing the user to continue navigating to the error.

Figure 6:
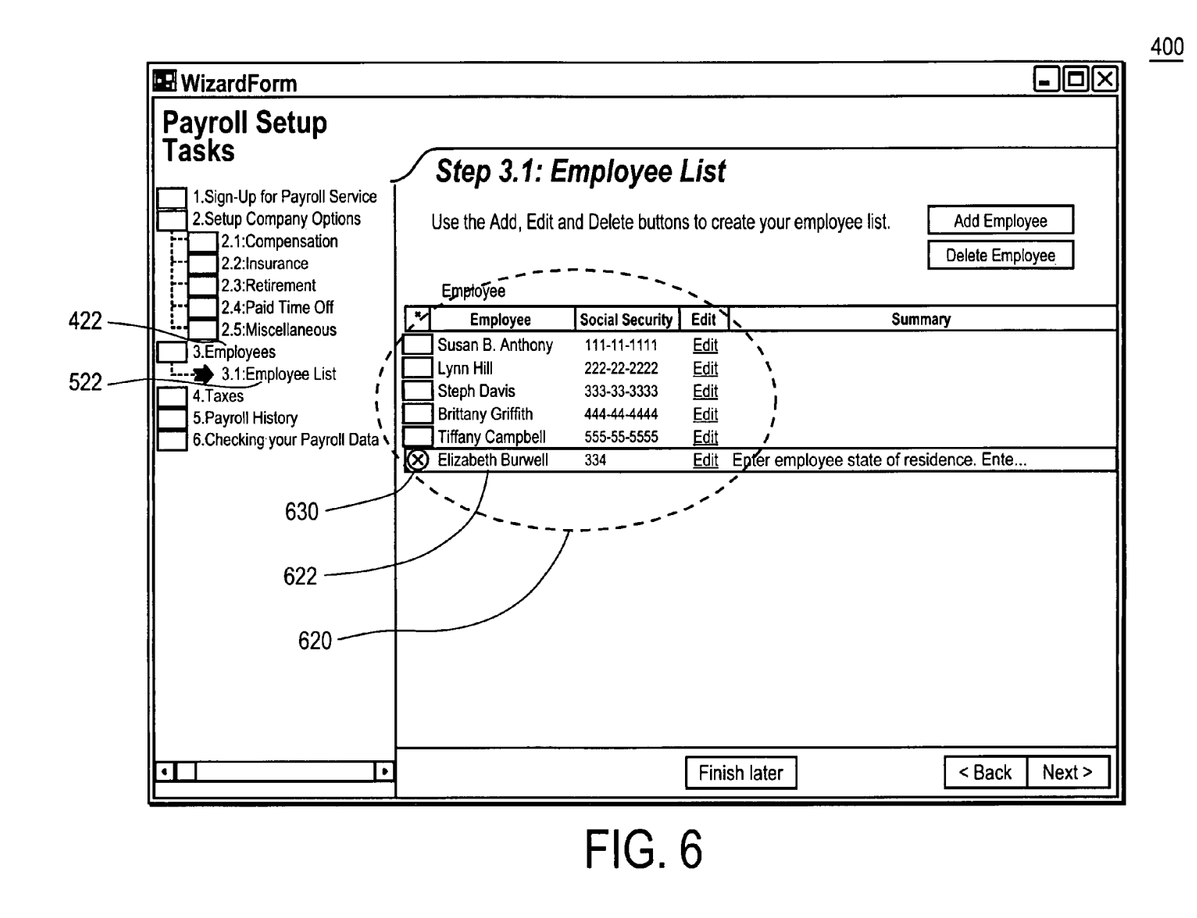
FIG. 6 is a schematic diagram illustrating a list of records within a selected sub-task according to one embodiment of the present embodiment.

As shown in FIG. 3, in response to selecting a member of the list of sub-tasks, the member is expanded 340. A list of records is displayed within a selected sub-task which includes at least one record with a data entry error 350. FIG. 6 illustrates one example of the user interface 400 that includes a list of records 620 within the sub-task Creating Employee List 522. An error indicium 630 indicates errors within a record. As a result, the user can navigate to the record to view and correct errors.

Figure 7:
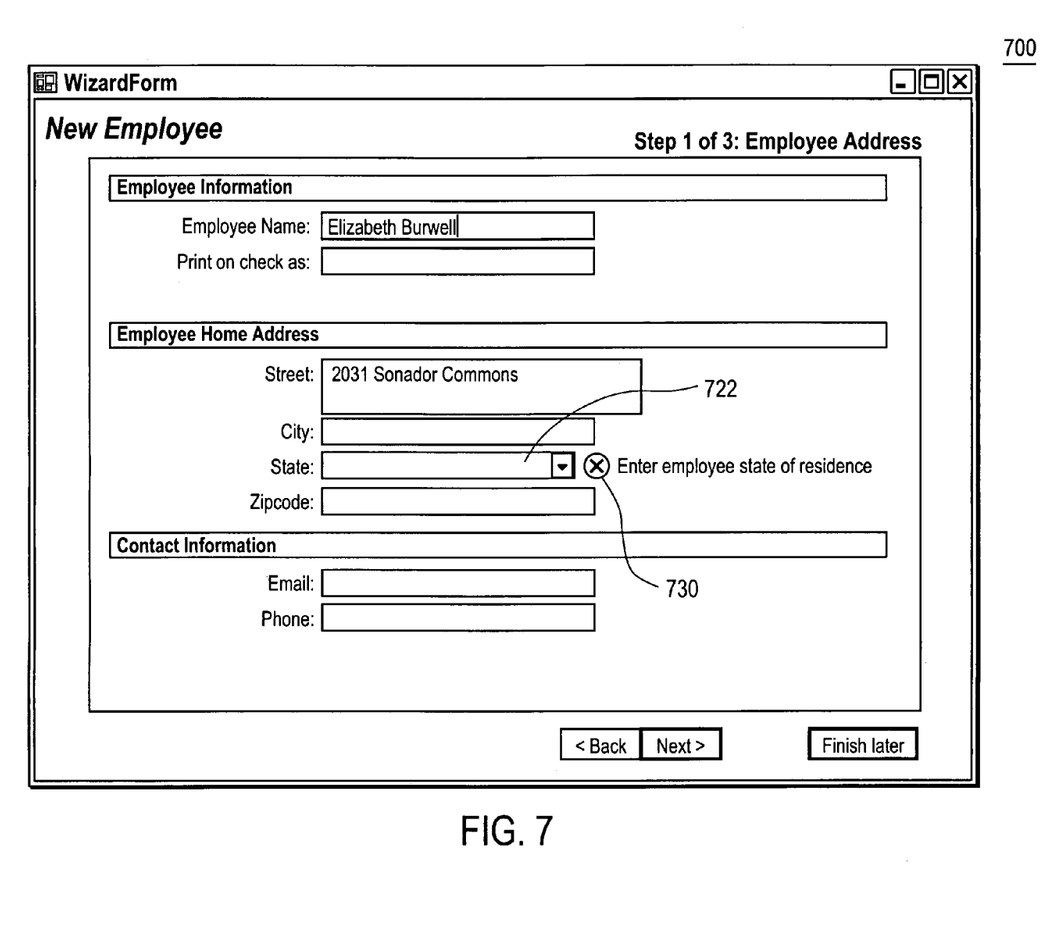
FIG. 7 is a schematic diagram illustrating a selected record within a sub-task according to one embodiment of the present embodiment.

Referring to FIG. 3, in response to selecting a member of the list of records 360, the record itself is displayed which includes error indicium associated with data fields having a data error 370. FIG. 7 illustrates one example of a record 700 that includes a data field 722 with an error. As with other levels of the expandable tree, an error indicium 730 draws attention to a location of the error within the record 700. In particular, during the initial configuration, the user submitted the record 700 without designating a state. The state may be needed to determine which banks and/or legal processes are used for depositing a payroll check. Without this critical information, payments may not be able to be made.

Figure 8:
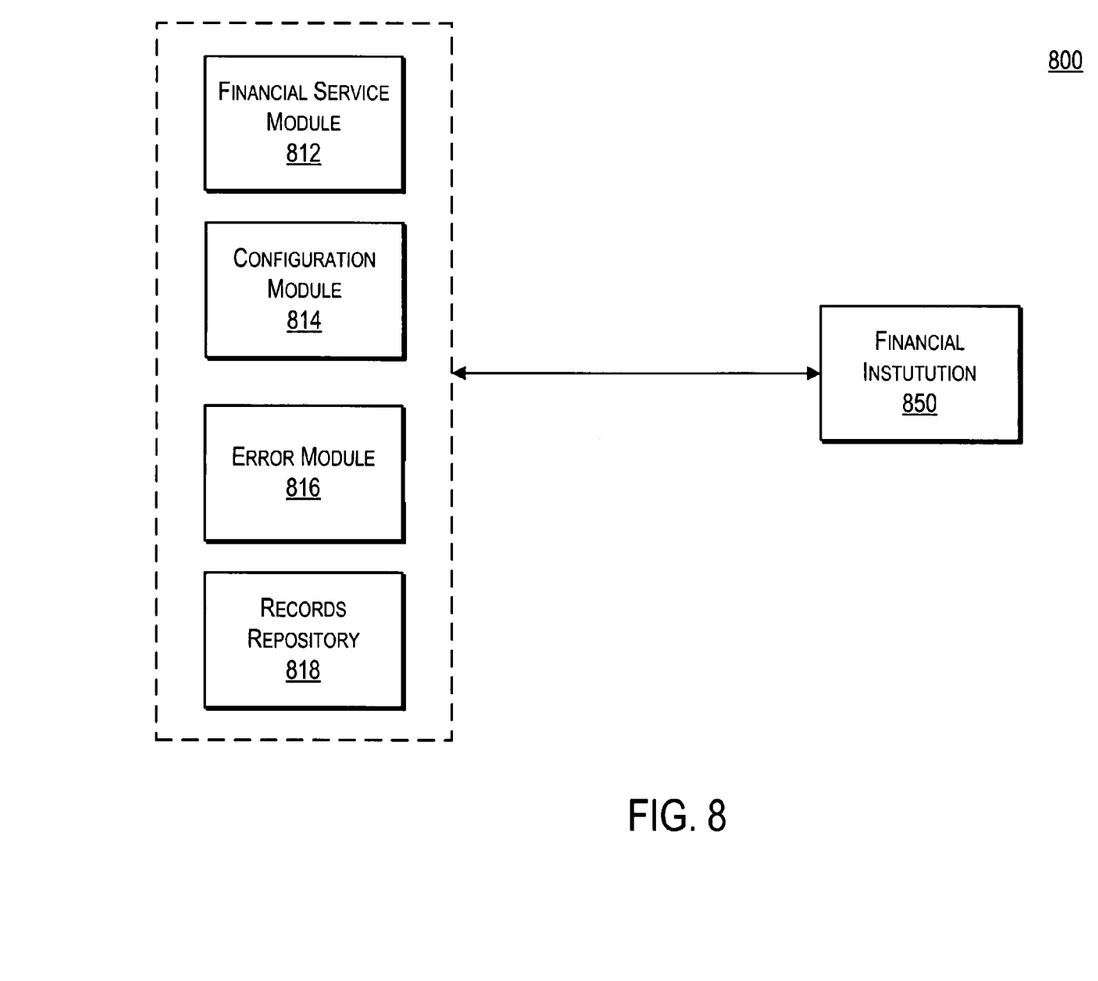
FIG. 8 is a block diagram illustrating a system for presenting errors within context according to one embodiment of the present invention.

FIG. 8 is a block diagram illustrating a system 800 for presenting errors within context according to one embodiment of the present invention. The system comprises 200 a financial service module 212, a configuration module 214, an error module 216, and a records repository 218, together in communication with a financial institution 250. Communication can occur over a data or telephonic network, a bus, through wireless transmission, etc. The system 800 can be implemented in a device such as a personal computer or handheld device executing software instructions. The system 800 can be located on a single device or distributed across a network (e.g., local application software or web-based software). In one embodiment, the system 800 can implement the methods described herein, and is a means for doing so, as recited in the claims.

The financial service module 212 can be an automated money management application such as payroll management, escrow services, bill payments, and other services. The financial service module 212 uses data entered by the user (e.g., data in the records repository 218) to automatically perform a financial transaction, and is a means for doing so. The financial service module 212 can be a client of the financial institution 250. The financial institution 250, in such an embodiment, can receive and process financial transactions (and other types of transactions such as general client/server transactions, database transactions, and storage network transactions.) from the financial services module 212. For example, a bank can receive certain funds into a particular account at a scheduled time.

The configuration module 214 can be a script, set of user interfaces, wizard, or tutorial that facilitates data collection. The configuration module 214 can be a separate module as shown (e.g., a plug-in), or be integrated with the financial service module 212. The configuration module 214 can initiate upon a new install, registration of a new user or profile, or from a menu. The configuration module 214 can present a user interface with data entry fields, and store data entries in the records repository 218, and is a means for doing so.

The error module 216 tracks data entry errors occurring during configuration, and is a means for doing so. The error module 216 can use a flag, bitmap, or other entry related to the error. The entry can indicate that there is an error, and in some embodiments, indicate the type of error (e.g., hard, soft, or manual error), indicate a location of the error (e.g., top-level task, sub-task, or record), indicate remedial measures, or indicate how to display the error in context. In some embodiments, the error module also displays the error and controls navigation (e.g., see FIGS. 4-7).

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying," refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magneti-coptical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for contextually representing errors during data entry, comprising:
   obtaining, using a processor of a computer system, an expandable and collapsible tree (ECT) corresponding to a data entry process, wherein the ECT comprises a first node, a second node, and a third node,
      wherein the first node corresponds to a tax data entry task of the data entry process, and
      wherein the third node corresponds to a transaction data entry task of the data entry process;
   displaying, using the processor, an expanded display of the ECT,
   wherein the first node, the second node, and the third node are visible in the expanded display of the ECT, and
   wherein the first node and the third node are children of the second node;
   presenting, using the processor, a tax record corresponding to the tax data entry task, wherein the tax record includes a data field for entry of data;
   receiving a data entry for the data field, wherein the data field is associated with an acceptable data range;
   determining that the data entry comprises a data entry error when the data entry is not within the acceptable data range;
   displaying, in association with the data field, a first error indicium indicating the data entry error;
   displaying, on a collapsed display of the ECT, in association with the second node, a second error indicium indicating the data entry error corresponding to the first node, wherein the second node is visible in the collapsed display of the ECT, and the first node is not visible in the collapsed display of the ECT when the second error indicium is displayed; and
   upon displaying the second error indicium, presenting a transaction record corresponding to the transaction data entry task.

2. The method of claim 1, wherein displaying the second error indicium comprises:
   temporarily delaying progression through the plurality of tasks while displaying the second error indicium.

3. The method of claim 1, further comprising:
   responsive to selecting the second error indicium, presenting a list of records including the tax record having the data entry error; and
   displaying the second error indicium in association with the tax record having the data entry error.

4. The method of claim 1, further comprising:
   responsive to selecting the second error indicium, presenting the tax record including the data entry error.

5. The method of claim 1, further comprising:
   storing error information including a location of the data entry error within the context of the plurality of tasks.

6. The method of claim 1, further comprising:
   receiving an indication from the user that the data entry is unreliable; and
   displaying a confirm indicium.

7. The method of claim 1, further comprising displaying, on the ECT in association with the first node, the second error indicium of the data entry error corresponding to the first node, wherein the portion of the ECT further includes the first node.

8. A computer readable storage medium storing a computer program executable by a processor, the computer program performing a method for contextually representing errors during data entry, comprising the steps of:
   obtaining, using a processor of a computer system, an expandable and collapsible tree (ECT) corresponding to a data entry process, wherein the ECT comprises a first node, a second node, and a third node,
      wherein the first node corresponds to a tax data entry task of the data entry process, and
      wherein the third node corresponds to a transaction data entry task of the data entry process;
   displaying, using the processor, an expanded display of the ECT,
      wherein the first node, the second node, and the third node are visible in the expanded display of the ECT, and
      wherein the first node and the third node are children of the second node;
   presenting, using the processor, a tax record corresponding to the tax data entry task, wherein the tax record includes a data field for entry of data;
   receiving a data entry for the data field, wherein the data field is associated with an acceptable data range;
   determining that the data entry comprises a data entry error when the data entry is not within the acceptable data range;
   displaying, in association with the data field, a first error indicium indicating the data entry error;
   displaying, on a collapsed display of the ECT, in association with the second node, a second error indicium indicating the data entry error corresponding to the first node, wherein the second node is visible in the collapsed display of the ECT, and the first node is not visible in the collapsed display of the ECT when the second error indicium is displayed; and
   upon displaying the second error indicium, presenting a transaction record corresponding to the transaction data entry task.

9. The computer readable storage medium computer program of claim 8, wherein displaying the second error indicium comprises:

temporarily delaying progression through the plurality of tasks while displaying the second error indicium.

10. The computer readable storage medium of claim 8, further comprising:
responsive to selecting the second error indicium, presenting a list of records including the tax record having the data entry error; and
displaying the second error indicium in association with the tax record having the data entry error.

11. The computer readable storage medium of claim 8, further comprising:
receiving an indication from the user that the data entry is unreliable; and
displaying a confirm indicium.

12. The computer readable storage medium of claim 8, further comprising the step of displaying, on the ECT in association with the first node, the second error indicium of the data entry error corresponding to the first node, wherein the portion of the ECT further includes the first node.

13. A system for contextually representing errors during data entry, comprising:
a processor;
a configuration module executing on the processor and configured to:
obtain, using the processor, an expandable and collapsible tree (ECT) corresponding to a data entry process, wherein the ECT comprises a first node, a second node, and a third node,
wherein the first node corresponds to a tax data entry task of data entry process, and
wherein the third node corresponds to a transaction data entry task of the data entry process;
display, using the processor, an expanded display of the ECT,
wherein the first node, the second node, and the third node are visible in the expanded display of the ECT, and
wherein the first node and the third node are children of the second node; and
present a tax record, corresponding to the tax data entry task represented by the first node, wherein the tax record includes a data field for entry of data; and
an error module executing on the processor and configured to:
receive a data entry error for input to the data field of the tax record, wherein the data field is associated with an acceptable data range;
determine that the data entry comprises a data entry error when the data entry is not within the acceptable data range;
display, in association with the data field, a first error indicium indicating the data entry error;
display, on a collapsed display of the ECT, in association with the second node, a second error indicium indicating the data entry error corresponding to the first node while allowing further progression through the plurality of tasks, wherein the second node is visible in the collapsed display of the ECT, and the first node is not visible in the collapsed display of the ECT when the second error indicium is displayed; and
upon displaying the second error indicium, present a transaction record corresponding to the transaction data entry task.

14. The system of claim 13, wherein displaying the second error indicium comprises:
temporarily delaying progression through the plurality of tasks while displaying the second error indicium.

15. The system of claim 13, further comprising:
responsive to selecting the second error indicium, presenting a list of records including the tax record having the data entry error; and
displaying the second error indicium in association with the tax record having the data entry error.

16. The system of claim 13, further comprising:
receiving an indication from the user that the data entry is unreliable; and
displaying a confirm indicium.

17. A system for contextually representing errors during data entry, comprising:
means for obtaining an expandable and collapsible tree (ECT) corresponding to a data entry process, wherein the ECT comprises a first node, a second node, and a third node,
wherein the first node corresponds to a tax data entry task of the data entry process, and
wherein the third node corresponds to a transaction data entry task of the data entry process;
means for displaying an expanded display of the ECT,
wherein the first node, the second node, and the third node are visible in the expanded display of the ECT, and
wherein the first node and the third node are children of the second node;
means for receiving a data entry for a data field, wherein the data field is associated with an acceptable data range;
means for presenting a tax record, corresponding to the tax data entry task, wherein the tax record includes the data field for entry of data;
means for determining that the data entry comprises a data entry error when the data entry is not within the acceptable data range;
means for displaying, in association with the data field, a first error indicium indicating the data entry error;
means for displaying, on a collapsed display of the ECT, in association with the second node, a second error indicium indicating the data entry error corresponding to the first node, wherein the second node is visible in the collapsed display of the ECT, and the first node is not visible in the collapsed display of the ECT when the second error indicium is displayed; and
means for, upon displaying the second error indicium, presenting a transaction record corresponding to the transaction data entry task.

* * * * *

UNITED STATES PATENT AND TRADEMARK OFFICE
CERTIFICATE OF CORRECTION

| | | |
|---|---|---|
| PATENT NO. | : 7,965,275 B1 | Page 1 of 1 |
| APPLICATION NO. | : 11/332416 | |
| DATED | : June 21, 2011 | |
| INVENTOR(S) | : Karl Lew | |

It is certified that error appears in the above-identified patent and that said Letters Patent is hereby corrected as shown below:

In Claim 9, Column 8 (line 65), the words "computer program" should be deleted.

Signed and Sealed this
Twenty-seventh Day of September, 2011

David J. Kappos
*Director of the United States Patent and Trademark Office*